T. WILES.
Straw Cutter.

No. 15,108.

Patented June 10, 1856.

UNITED STATES PATENT OFFICE.

THOMAS WILES, OF SOMERSET, OHIO.

STRAW-CUTTER.

Specification of Letters Patent No. 15,108, dated June 10, 1856.

*To all whom it may concern:*

Be it known that I, THOMAS WILES, of Somerset, in the county of Perry and State of Ohio, have invented a new and useful Improvement in Straw-Cutters; and I do hereby declare that the following is a full, clear, and exact description of the construction and operation of the same, reference being had to the annexed drawing, forming part of this specification, in which—

Figure 3:
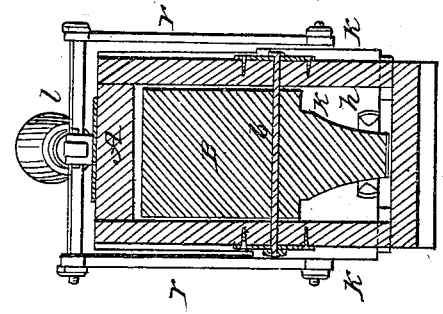
Figure 2:
Figure 2:
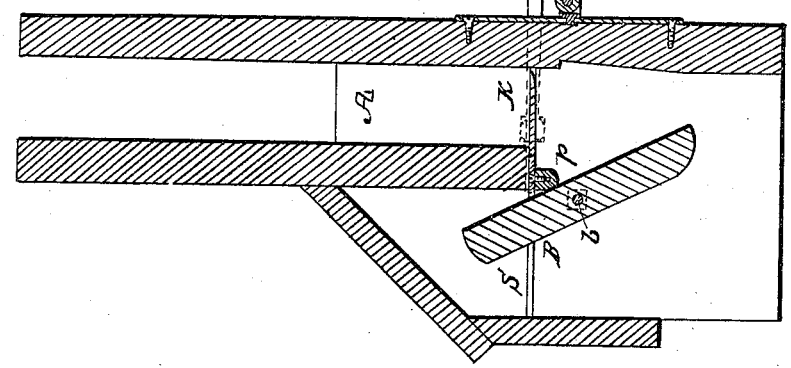
Figure 1:
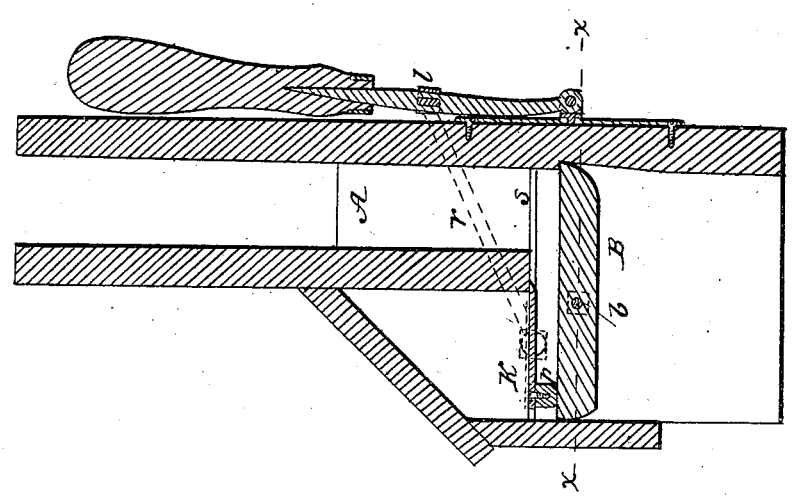

Figure 1 is a vertical section of machine, taken parallel to side; at the time of feeding the straw; Fig. 2 is a similar view at the time of cutting. Fig. 3 is a horizontal section on $x$ $x$; with machine inverted.

Similar letters denote the same part.

The nature of my invention consists in constructing the machine with a swinging bottom, heaviest on side under the straw; so as to fall and discharge the cut straw at the completion of the cut, and be drawn into a horizontal position to receive the end of the straw, by the backward motion of the cutter, as will be hereinafter set forth.

In the drawing A is a vertical trunk into which the straw is placed, and allowed to fall until the end of the bundle of straw rests on the feed and discharge bottom B. This bottom, of the form shown in Fig. 3, is swung on bar $b$, so that its heaviest end is under trunk A.

K is the cutter reciprocated horizontally by lever $l$ and rods $r$; the knife moving in horizontal slots $s$ in sides of box. On the under side of cutter is a projection $p$ in thickness equal to the distance between bottom of cutter and upper face of bottom B.

The operation of the machine is as follows: The straw being inserted when the cutter is in position shown in Fig. 1; lever $l$ is drawn into position shown in Fig. 2, bringing the cutter in contact with the straw and separating the protruding end. A projection $p$ passes to the right of bar $b$, bottom B falls into position shown in Fig. 2 and discharges the cut straw. Raising lever $l$, and carrying knife $k$ back, causes projection $p$ to bring bottom B into a horizontal position; to receive the end of the straw, which falls through trunk A. In this manner the operation proceeds: bottom B receiving the straw for the feed as the knife moves backward, and discharging the cut straw as the knife severs it.

I claim—

The feed and discharge bottom B in combination with the reciprocating knife projection $p$, arranged and operating as, and for the purposes specified.

In testimony whereof, I have hereunto signed my name before two subscribing witnesses.

T. WILES.

Witnesses:
N. H. OVERMYER,
JOHN McNUTT.